April 29, 1947. G. D. WILCOX 2,419,807
AUXILIARY POWERED VEHICLE CONSTRUCTION
Filed Dec. 19, 1938 3 Sheets-Sheet 2

INVENTOR.
GEORGE D. WILCOX.
BY Walter E. Schismer
ATTORNEY.

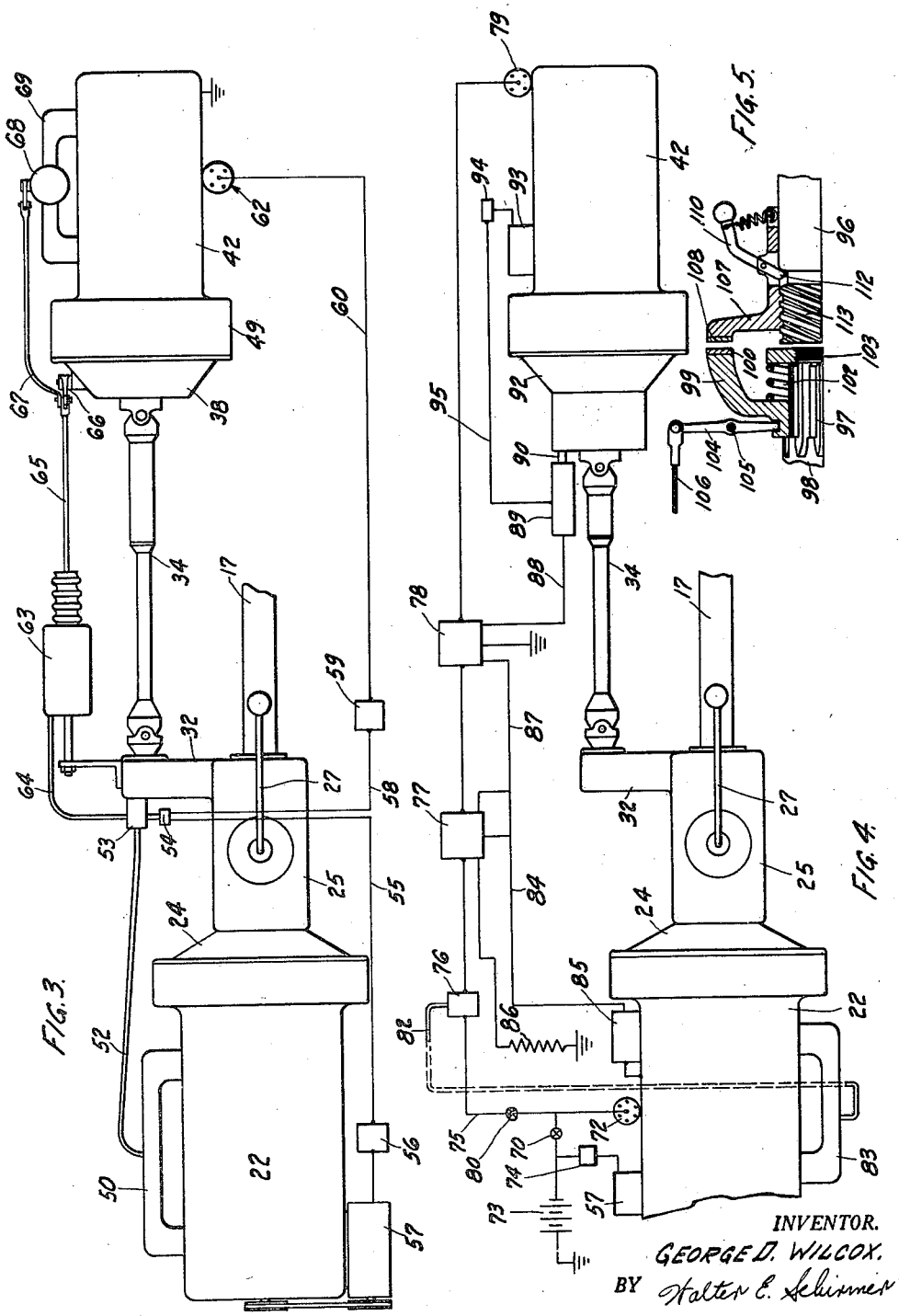

Patented Apr. 29, 1947

2,419,807

UNITED STATES PATENT OFFICE 2,419,807

AUXILIARY POWERED VEHICLE CONSTRUCTION

George D. Wilcox, Detroit, Mich., assignor of one-half to Frederick J. Haynes, Detroit, Mich.; Frank C. Cook executor of Frederick J. Haynes, deceased, and John Conway Cook executor of George D. Wilcox, deceased Application December 19, 1938, Serial No. 246,565

12 Claims. (Cl. 180—54)

This invention relates to vehicles, and more particularly is directed to an improved power drive combination for heavy duty vehicles such as trucks, busses, rail cars and the like.

Present day transportation requirements are such that trucks and similar vehicles are powered to carry predetermined pay loads at fairly consistent speeds over flat country. However, it is common experience that such vehicles are frequently overloaded, and even when not overloaded the power in such trucks is not sufficient to maintain adequate speed of the vehicle in climbing grades and the like in hilly or mountainous country. Such vehicles crawl up grades under load at speeds which are so slow as to cause numerous accidents due to attempts of trailing higher speed vehicles to pass the slow moving truck or bus when going up hill. This occurs in spite of highway regulations prohibiting passing under such conditions, due mainly to the extremely slow speed of the heavily loaded vehicle and the impatience of the trailing driver.

In attempting to overcome such a situation it has become increasingly apparent that the solution does not lie in trying to prevent passing under such conditions, but rather in speeding up the slow vehicle to a point where it will not unduly retard traffic on grades. Speeds of twenty to thirty-five miles per hour, for example, would do much to eliminate the accidents as at such speeds traffic would not be impeded to an extent such as to cause disregard for the obvious dangers inherent in passing under such conditions.

One manner in which the speed of the transport vehicle could be increased in climbing grades would be to install larger and more powerful engines therein, adequate to maintain the desired speeds on grades. However, this is impractical since it would produce uneconomical operation of the power unit under normal driving conditions on flat terrain, and the available power would be utilized only occasionally, being wasted during the time that full power was not required.

I have conceived of a manner of solving this problem which will result in economical operation of the truck or bus at all times, without requiring the use of an extremely powerful engine which is utilized at full capacity only at infrequent intervals. The primary concept of my invention is the provision of an auxiliary or booster power unit, of a size and capacity such as to furnish, with the standard or primary power unit now installed in the vehicle, ample power for maintaining the desired speed on grades, but which is only in operation when such power is required, and at other times is inoperative. This eliminates the uneconomical constant operation of a large power unit at all times, whether full power is required or not.

One of the primary objects of the present invention is to provide a secondary, or booster power unit, directly coupled to the power train of the vehicle, and which will automatically deliver its full power to the driving mechanism to supplement the main drive under certain predetermined conditions.

It is essential, in order to gain the greatest possible benefit from such a system, that the auxiliary or booster engine be controlled in response to predetermined speed and power requirements in the vehicle, so that it will be operated only at such times that its power is necessary to maintain the vehicle at a predetermined speed. As an example of such a control, but not in any sense as limiting the possible application of the system, it may be desired that the booster engine operate whenever the vehicle speed decreases below 35 miles per hour under full throttle. Under such conditions the booster engine is started, comes up immediately to full torque, and adds its driving effort to that of the primary power source to deliver sufficient torque for maintaining a predetermined speed. Should the speed continue to decrease, even with both units operating, due to extremely heavy loads or extremely steep grades, the system can be arranged to allow shifting into the next gear ratio, and both engines can be used for power in such gear ratio.

Obviously, it would not be desirable to operate the booster engine when moving away from a stop on level territory in low gear with standard axle constructions, and consequently a control may be provided to insure that the booster engine will operate only in high or intermediate gears in speed ranges between say 15 and 35 miles per hour. Of course, with modified driving gear assemblies, it is contemplated that the booster engine may be used at all times when additional power is required. Control may be electrical or pneumatic, or a combination of both. I have found that the control responsive to throttle position may readily be a vacuum control from the intake manifold set to operate between 90% to 100% full open throttle position and to become inoperative at below 50% full open throttle.

The speed control, that is, responsive to speed of the vehicle, may be electrical, controlled from a motor-driven generator, with relays wound to cut in and cut out at certain speeds, or responsive to certain propeller shaft speeds, or may be a mechanical control of the centrifugal or governor type.

The two controls must necessarily be interlocked in such manner that neither will independently cause the booster engine to operate.

One of the features of the present invention is the independent automatic control of the booster mechanism, requiring no attention on the part of the operator, and insuring proper use of the mechanism at all times, thereby protecting the main power plant from overload, and maintaining adequate speed of the vehicle under the conditions described.

Another feature of the present invention resides in the provision of a simplified booster mechanism construction which may be manufactured and sold as a unit for attachment to vehicles now in use, without requiring any appreciable modification in the drive mechanism already installed in the vehicle.

A still further feature of the present invention is the design of a booster mechanism such that automatic control thereof is simplified, and which can be adjusted for response in accordance with conditions desired by the owner, or to conform to legislative requirements. The mechanism remains the same regardless of the conditions under which it is desired that it operate, necessitating only adjustment in control arrangements.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 3 is a diagrammatic showing of one form of control for the system;

Figure 4 is a view of a modified control system; and

Figure 5 is a detailed sectional view of one of the control elements shown in Figure 4.

Figure 1:
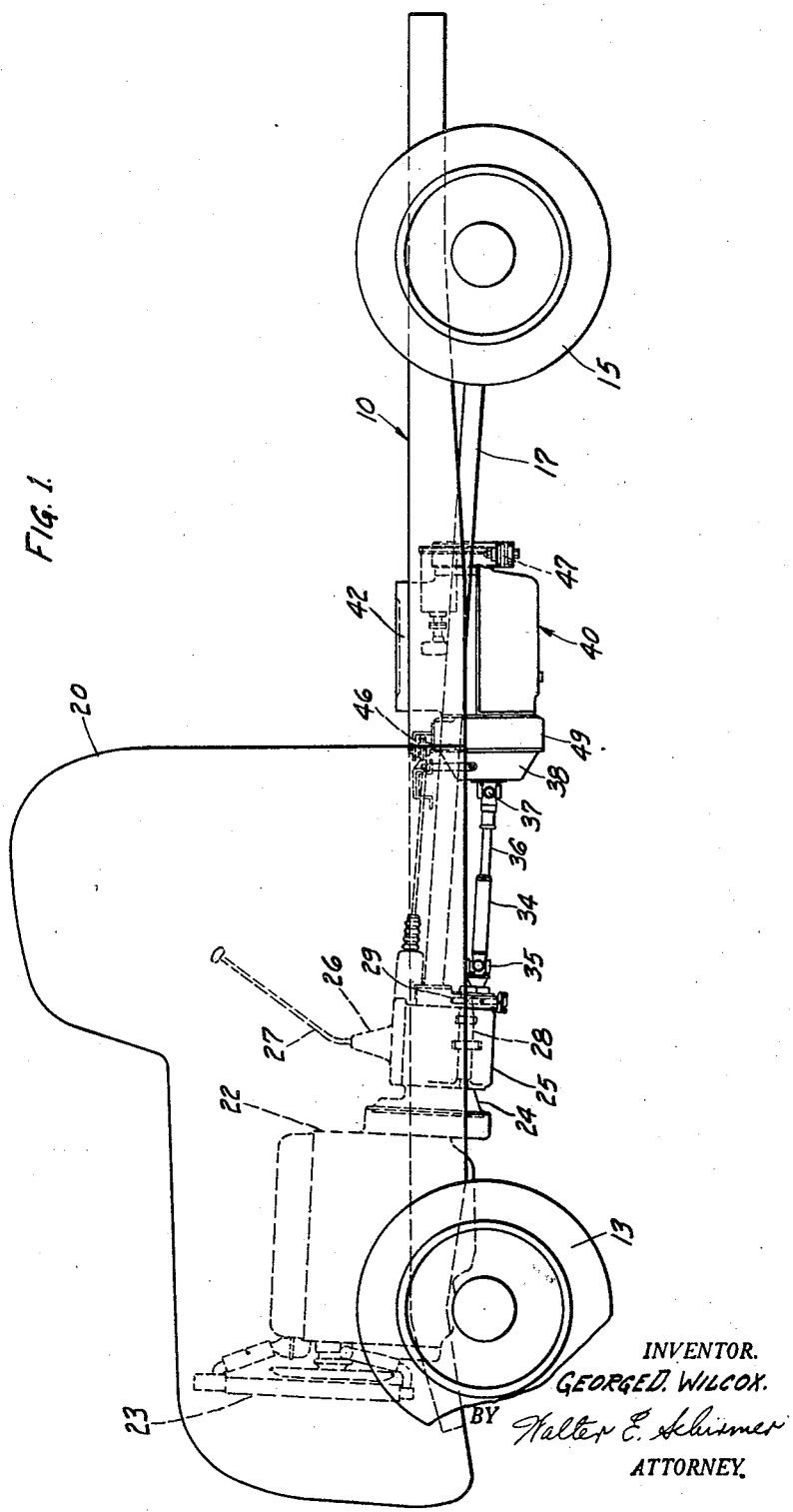
Figure 1 is a side elevational view, parts being shown somewhat diagrammatically, of a vehicle embodying the invention.

Considering now the drawings in detail, a truck chassis is indicated generally at 10 and includes a front axle assembly 12 having the steering wheels 13 secured at opposite ends thereof. The chassis is also provided with a rear axle 14 which may be of the banjo full-floating type, and may have either single or dual wheels 15 journalled at the outer ends thereof. At the center of the rear axle there is provided a differential 16 of any standard or conventional construction to which is connected the propeller shaft or torque tube 17 inclined slightly upwardly and extending toward the power plant at the forward portion of the vehicle.

The chassis 10, which comprises the two side rails 18 and suitable cross members, some of which are not shown, including a center cross member 19, is adapted to support an operator's cab 20, shown more or less in silhouette in Figure 1, and of course a truck body of any desired type is mounted on the chassis rearwardly of the cab 20.

It is to be understood that the present invention is equally well applicable to a tractor-trailer combination or to a conventional type of truck structure, and if the former type of construction is employed, the chassis 10 will support a suitable fifth wheel mechanism for coupling the trailer thereto.

The main or primary power plant of the vehicle includes a primary engine 22, which may be an internal combustion engine, or may be of the Diesel type if desired, and which is supported in more or less conventional manner between the side rails 18 adjacent the forward end of the vehicle and extends partially over the front end of the vehicle. It is to be understood that the present invention is not limited to any specific location of the engine 22, and the illustrated showing thereof is intended for descriptive purposes only and in no way is to be construed as limiting. This engine is provided with the usual type of cooling system, including the radiator 23 disposed forwardly thereof and suitably connected to the cylinder head of the engine and to the cylinder block in the conventional manner. A suitable fan or other mechanism may be employed for drawing air through the radiator, and a water pump is also preferably provided for circulating the cooling fluid. The particular type and arrangement of these parts forms no part of the present invention except to show the general relationship and to indicate that the engine 22 may be of any conventional type such as provided by the truck manufacturer.

Secured to the fly wheel housing of the engine 22 is a suitable clutch housing 24 enclosing a conventional type of clutch mechanism, which is adapted to be controlled through suitable pedal operation or automatically, as desired. To the rear portion of the clutch housing 24 there is secured a transmission case 25 containing any type of suitable truck transmission, such as is normally provided with such vehicles. This transmission has a pedestal portion 26 through which the gear shifting lever 27 extends, the lever 27 being adapted for shifting the gears in the transmission through the various speed ratios.

Figure 2:
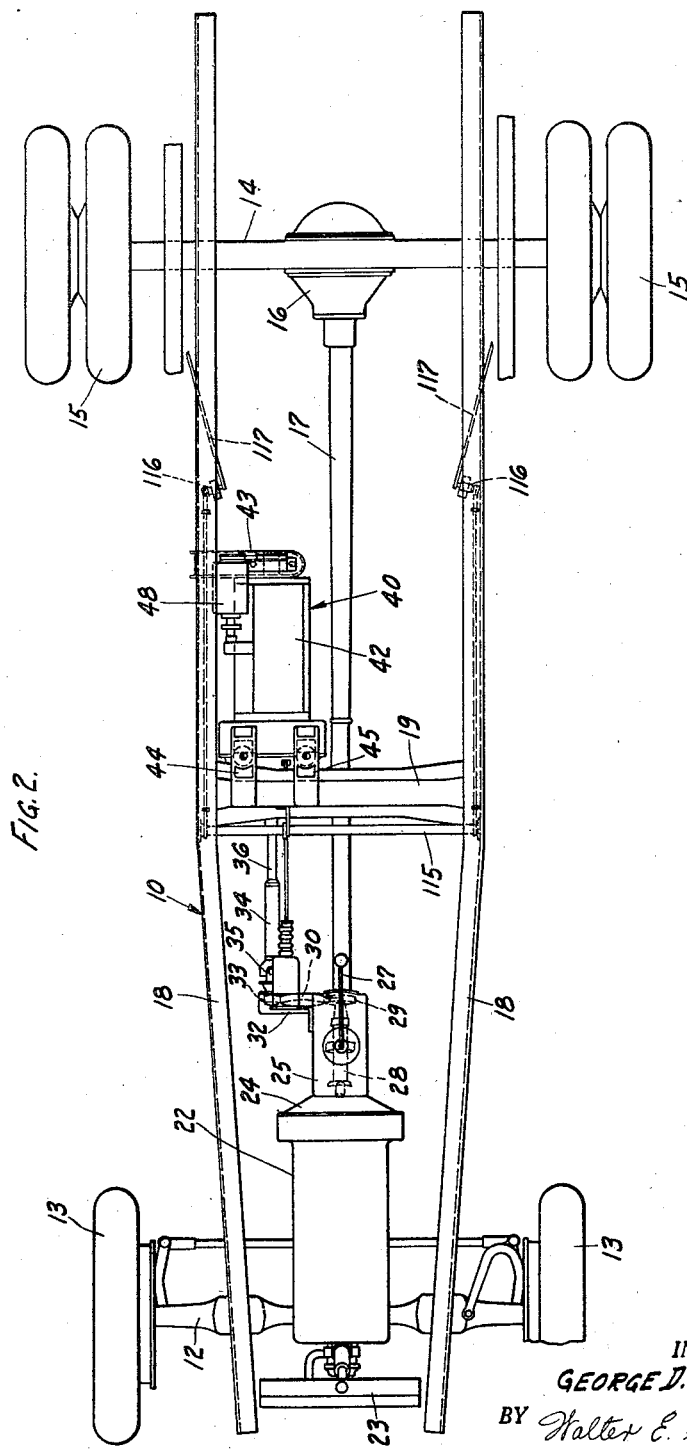
Figure 2 is a top plan view of the vehicle chassis shown in Figure 1.

The transmission is adapted to be provided with a countershaft 28, which is shown in dotted lines in Figures 1 and 2, and which departs from the conventional style in that at one end thereof there is provided a gear 29 keyed to the shaft and intermeshing with a gear 30 enclosed within a suitable laterally extending housing 32 which is bolted or otherwise secured to the side of the transmission case.

Within the housing 32 there is provided a third gear 33 having constant meshing engagement with the gear 30, and therefore adapted to rotate with the rotation of the countershaft 28. From the laterally extending housing 32, which may be termed a power input for the transmission, there is provided a torque transmitting or lay shaft, indicated generally at 34, which is connected through the universal joint 35 to the gear 33 and which has a splined extension 36 connected through a second universal joint 37 to the clutch shaft of a clutch 38, which will be described in more detail hereinafter. It will therefore be apparent that whenever the transmission 25 is in operation there will be a certain speed relation between the the countershaft 28 and the lay shaft 34 regardless of the direction of transmission of torque therebetween. The lay shaft 34 is preferably made with the sliding joint therein to accommodate variations in movement between the main power plant assembly and the supplementary or booster power plant assembly, which is indicated generally at 40. This booster power plant assembly includes an engine 42, which may be any standard type of internal combustion engine or Diesel engine and which is supported from the side rail 18 and the cross member 19 by means of suitable brackets 43, 44 and 45, riveted or otherwise secured to these frame members.

Preferably, the motor is hung from the brackets 44 and 45, as shown more clearly in Figure 1, and is cushioned relative thereto by suitable rubber biscuits 46, or like cushioning means which resiliently support the motor in position but allow it to float in cushioned relationship to the frame. Similarly, rubber biscuits 47 are provided between the engine 42 and the bracket 43 to support the forward end of the engine, it being noted that the engine 42 is mounted in a direction opposite to the engine 22 so that the output ends of the engines extend toward each other with the engine 42 being laterally offset with respect to the engine 22 at one side of the propeller shaft 17. Preferably, the crankshaft of the engine 42 is provided at its forward end with a pulley or similar driving means for driving a generator 48 supported at the side of the engine assembly, and which may also include a water pump or similar means for circulating cooling fluid from the engine 42 through a suitable radiator (not shown). The output end of the crankshaft of the engine 42 extends into the fly wheel housing 49, and is there connected to the clutch 38 so that the engine 42 may be clutched to the shaft 34.

From the description of the structure up to this point it will be apparent that the engine 42 can serve as a supplemental or booster engine for the power plant of the vehicle, since, when the engine 42 is in operation it will drive the shaft 34 and thereby impart torque through the gears 33 and 30 to the countershaft 28 of the transmission 25. This torque will be supplemental to the torque of the main power plant 22, and consequently will increase the torque output from the transmission to the propeller shaft 17, thus supplying the additional torque from the booster engine 42 to the driving axle 14. Thus the present system includes means for developing additional torque and transmitting the same to the drive train of the vehicle for supplementing the normal torque supplied by the primary engine to increase the torque transmitted to the driving axle for giving the vehicle either more speed or more power whenever the engine 42 is in operation.

While it is apparent the control of the engine 42 might be manual with an additional starting system and controls for this engine provided for the operator of the vehicle, so that at any time when he desired additional torque either for climbing grades or for producing a predetermined speed of the vehicle he could start the engine 42 and bring it up to a speed so that it would impart torque through the shaft 34 to the transmission, I contemplate providing an automatically operating control system for starting the engine 42 and delivering its torque to the vehicle under certain predetermined conditions.

Considering now in further detail the manner in which the booster engine may be automatically controlled to impart its driving torque to the vehicle, I have provided in Figures 3 and 4 optional control systems that can be employed for this purpose. The primary reason for requiring the automatic control is to eliminate the human element which would be present if this control were subject to the operator of the vehicle, and to make sure that the supplemental torque will be employed only under the conditions for which it is required. For example, it is contemplated that this supplementary booster unit be employed in order to maintain the vehicle above a predetermined minimum speed when climbing grades of a certain percentage slope. Inasmuch as the conditions under which the booster torque will be required may vary in different localities or in different legislative districts, it is essential that the control system be sufficiently flexible to allow automatic control of the equipment under these varying requirements.

In the control system shown in Figure 3 the manifold 50 of the main or primary engine 22 has a suction connection 52 thereto which terminates in a vacuum controlled valve 53 adapted to be mounted on the power take-off housing 32. The valve 53 may be arranged so that it will be opened on the occurrence of relatively low vacuum in the manifold 50, such as occurs when the throttle of the primary engine 22 is wide open. It is desirable that the valve 53 be opened only when the vehicle speed is within a predetermined range where the additional power from the engine 42 is required. Therefore the valve 53 is conditioned or released for operation or opening by means of a control mechanism 54, such as a latch, which is preferably electrically actuated and has one side of its operating mechanism connected through the conductor 55 and the relay 56 to the generator 57 of the primary engine 22. The opposite terminal of control mechanism 54 is connected through conductor 58 and control relay 59 to the conductor 60 leading to the ignition system indicated generally at 62 for the supplemental or booster engine 42.

Preferably the relay 56 is so designed that it will not close the circuit between the generator 57 and the conductor 55 until the speed of the vehicle, that is, the speed of engine 22, is above a predetermined minimum. This is to safe-guard the drive axle of the vehicle so that the booster engine will not operate at very low speeds of the vehicle such as in starting away from a stop or the like where the application of too much torque through the very low gear ratios would impose too great a strain on the driving axle. In one preferred system of control the relay 56 may be set so that it does not operate until the vehicle speed is above 10 miles per hour. The operation of this relay merely conditions the control mechanism 54 for operation, but obviously will not allow this mechanism to operate until such time as the circuit is completed through the control relay 59 which is employed for energizing the ignition circuit of the secondary or supplemental power unit.

The control relay 59 is preferably set so that it will cut in at engine speeds below 35 miles an hour and will stay in energized position until a minimum engine speed of 20 miles an hour is reached, assuming direct driving engagement or high gear operation. In other words, during this speed range the relay 59 will be closed to effect the energization of the ignition circuit of the engine 42. However, this in itself will not operate the engine 42 without some means for starting the engine. This is provided by means of the vacuum controlled clutch operating mechanism 63 which is connected through the conduit 64 to the valve 53. The mechanism 63 includes a cylinder having a plunger therein provided with the extending arm 65, the plunger being normally biased by means of a suitable spring or the like to extended position. When the valve 53 is allowed to open under the influence of control mechanism 54, which occurs only when both relays 56 and 59 are energized, it provides for communication between conduits 52 and 64. The valve 53 is arranged, as set forth above, so that it will be opened only under substantially full open throttle conditions, at which time, even though the vacuum in manifold 50 is relatively low, it is sufficient so that the mechanism 63 will be actuated to retract arm 65 thereby actuating the clutch engaging arm 66 to engage the clutch 38 between lay shaft 34 and engine 42. Inasmuch as lay shaft 34 is being driven from the countershaft 28 of the transmission this results in cranking the motor 42, and since the ignition circuit 62 is also energized, the engine 42 starts and is automatically brought up to full speed by reason of the connection 67 from the arm 65 to the throttle valve in the carburetor 68 connected to the intake manifold 69 of the engine 42. As the engine 42 thus comes up to full speed it overcomes the cranking effort of the lay shaft 34 and starts to deliver torque to this shaft, thereby imparting torque to the countershaft of the transmission 25 to supplement the normally available torque of the engine 22. This torque is continously delivered by the engine 42 as long as a full open throttle condition exists at the primary engine 22, and the speed of the vehicle remains within the range of 35 to 20 miles per hour.

If the speed of the vehicle in high gear drops below 20 miles per hour the control relay 59 is de-energized, thereby de-energizing the ignition circuit for the booster engine 42 and thus stopping the booster engine. Thus the operator, if he still requires additional torque, must shift into a lower speed ratio and again bring about a condition of full open throttle. Due to the fact that the relay 59 is controlled as a function of engine speed and not propeller shaft speed, in the lower gear ratio the engine speed will increase to a point where the relay 59 will again be energized, and under full open throttle conditions the booster engine 42 will again deliver its torque to the driving train. However, if the speed of the vehicle gets to a point below the setting of relay 56, the entire booster control system is rendered inoperative, as under such conditions the imparting of additional torque to the drive axle would place too severe a strain thereon.

Similarly, if when the booster engine 42 is operating the additional torque supplied thereby is sufficient to increase the speed of the vehicle above 35 miles an hour, the relay 59 will be de-energized, thereby cutting out the booster engine, as above such speeds it is not contemplated in this particular embodiment of the invention that the booster engine be operated.

Another factor controlling the operation of the booster engine is the throttle condition at the primary engine. For example, if more some reason within the speed range of 20 to 35 miles per hour the operator does not have a full or substantially full open throttle due to the fact that he does not want to drive any faster than this speed, the booster engine will not be operated due to the fact that the clutch 38 will be released because of the vacuum condition at the mechanism 63. This disengages the booster engine 42 from the shaft 34 so that whether the booster engine operates or not, it cannot deliver torque to the driving train of the vehicle.

It will be obvious that relays 56 and 59 can be of any desired type and may be designed to operate at any required point, and the speed ranges and limits described in connection with the system shown in Figure 3 are to be understood as being exemplary in character and only for the purpose of describing one manner in which the mechanism might be set for operation, it being obvious that the speed range could be widened or narrowed, raised or lowered, or the throttle control range may be increased to, say, anywhere from 60% full throttle up to full throttle position.

In Figure 4 another type of control system is disclosed which eliminates some of the mechanical connections employed in Figure 3, and relies more upon electric control of the various parts of the mechanism.

In this embodiment of the invention the main engine 22 has the generator 57 thereof connected through the ignition switch 70 to the ignition system indicated diagrammatically at 72 for the primary engine 22. A battery 73 is also provided for starting current and is cross connected with the generator through the generator cut-out relay 74. From the ignition switch 70 a power conductor 75 is connected through switches 76, 77 and 78 to the ignition system indicated diagrammatically at 79 for the booster engine 42. A manually operable switch 80 is provided in this line so that the booster engine may be cut out entirely in case of disablement thereof or mechanical breakdown of any of the connecting parts, or for any emergency purposes. The switch 76 is a vacuum controlled switch which is connected through conduit 82 to the intake manifold 83 of the primary engine 22 and therefore is responsive to throttle conditions at the primary engine for operation.

The switch 77 has a conductor 84 connected thereto which leads to a generator 85 driven by the primary engine, and corresponds, to some extent, in function and operation to the control relay 56 of Figure 3. The relay 77 is a minimum speed control for preventing operation of the booster engine system when the engine speed is below a predetermined minimum. It may be adjustable in character, and a suitable grounded resistance 86 is employed for controlling the point at which it will operate.

The switch 78 corresponds in function to the control relay 59 of Figure 3, and is connected through the supplementary conductor 87 to the generator 85 so as to be responsive to engine speeds of the engine 22. This relay is set for operation within a predetermined speed range, such, for example, as from 20 to 35 miles per hour, or any other desired range. There is a power connection from the switch 78 through the conductor 88 to a solenoid 89 which has its plunger 90 connected in any suitable manner to the clutch throwout arm of the clutch 92 which couples the shaft 34 to the booster engine 42. The solenoid 89 is adapted to move the arm 90 to engage the clutch 92 for cranking the engine 42 when its supplementary torque is required. A suitable generator 93 is driven from the booster engine 42, and through the cut-out relay 94 is designed to control the operation of solenoid 89 through conductor 95 so that after the engine has been started and the generator 93 begins delivering a certain amount of current, the solenoid 89 will be de-energized to release the pull on the arm 90.

However, this will not disengage the clutch during normal operation of the booster engine because of the particular clutch design employed, which is shown in more detail in Figure 5, to which reference will now be had.

The clutch shown in Figure 5 is adapted to effect clutching engagement between the engine crankshaft 96 of the booster engine 42 and the splined end 97 of the clutch shaft 98. Mounted on the splined and reduced end 97 of the shaft 98 is a clutch member 99 having a clutch facing 100, and which is axially slidable on the shaft 97. A suitable spring 102 is biased between an end nut 103 on the shaft 98 and the member 99 to normally hold the member 99 against the radial abutment formed between the reduced portion 97 and the normal portion of the shaft 98. A suitable clutch actuating arm 104 is pivotally mounted at 105 in the clutch housing, and engages in a suitable clutch collar on the hub of member 99 to force member 99 along shaft section 97 against the pressure of spring 102 when the arm 104 is rotated in a counter-clockwise direction by a pull being imposed on the connection 106 at the upper end thereof. This connection 106 is preferably connected to the solenoid core arm 90 so that when the solenoid core 90 is drawn into the solenoid 89 by action of switch 78 the clutch arm 104 is operated to move clutch member 99 to engagement with clutch member 107 mounted on shaft 96. This clutch member 107 has a corresponding clutch facing 108 so that when member 99 engages therewith the member 107 will impart cranking movement to the shaft 96, which in turn will start the booster engine 42.

As the booster engine is started the generator 93 feeds current through relay 94 and conductor 95 to deenergize the solenoid 89, thereby releasing the pull on arm 104 allowing spring 102 to move clutch member 99 against the abutment on shaft 98. However, during this time, engine 42 is coming up to speed and as a result, the speed control members 110 carried thereby on the hub portion of member 107 move outwardly due to the increased speed of rotation of shaft 96 as engine 42 comes up to speed. This results in a camming action of the inner ends 112 of these arms on a shoulder on shaft 96 threading the member 107 forwardly on the relatively steep pitched threaded end 113 of the shaft 96. This moves clutch member 107 forwardly into engagement with clutch member 99 to thereby clutch engine 42 to shaft 34 in driving relation for imparting driving torque to the transmission 25 to supplement the torque of engine 22. It will be apparent that by reason of this action there is no positive clutching connection between the shaft and the booster engine during the time that the booster engine is coming up to speed after it has been started by the cranking action at the clutch, since the member 99 has moved away due to de-energization of solenoid 89, and member 107 does not follow until the speed of shaft 96 is sufficient to be threaded forwardly on this shaft by the centrifugal action of arms 110.

This control system is designed to operate under the same type of conditions as the control system in Figure 3 inasmuch as it is necessary to have full open throttle conditions to maintain switch 76 energized so that if the throttle is not in its proper range of position the switch will be de-energized, thereby cutting off the circuit to the booster engine. Similarly, if the vehicle is moving at less than the predetermined minimum speed the switch 77 will be de-energized, or if the vehicle exceeds or falls below the range of speed within which switch 78 is energized, the same conditions occur.

One of the features of the present invention is the fact that this system does not interfere in any substantial manner with the conventional type of power plant and drive mechanism installed in a vehicle, and consequently can be added to any vehicles now in operation without requiring any appreciable change in construction—requiring only a connection to the side of the transmission and the installation of the control system which is mostly electric. One chassis change which has to be made on certain types of vehicles is the shifting of the brake equalizing mechanism in order to have this mechanism pass around the booster engine 42. This is shown clearly in Figure 2 in dotted lines in which the brake equalizing cross rod 115 has the connections for the rear wheels extending within the side rails 18 and supported at the side rails, as indicated at 116 for the connections 117 to the rear wheel brakes of the vehicle. Other than this chassis change and the mounting of the supporting brackets 43, 44 and 45 on the chassis, the installation of such a booster unit in conventional type vehicles is simple and inexpensive, and can be done by any competent garage or service station mechanic.

It is therefore believed apparent that I have provided a novel type of power system which allows the use of additional torque under certain predetermined conditions but eliminates the expense of operating this additional power supply except at such times that its operation is required, and which therefore renders the entire system very economical in use.

I am aware that numerous changes can be made in the location of the various constituent parts of the assembly herein shown and described, and that connection of these parts to other parts may be modified or the inter-relation of the driving connections may be changed without departing in any fundamental manner from the broad concepts and principles disclosed herein. It is intended that the drawings and detailed description hereof be considered merely as exemplifying one manner in which the invention may be carried out and should not be construed in any manner as limiting the invention, but limited only as defined by the scope and spirit of the appended claims.

I claim:

1. In combination, a vehicle chassis having a driving axle, a power unit including a transmission for transmitting torque to said axle, said transmission having a countershaft, a second shaft laterally offset from said transmission and geared to said countershaft, a supplemental power unit having a clutch connected to said second shaft, and means responsive to the speed of rotation and throttle conditions at said first power unit for starting said supplemental power unit and engaging said clutch.

2. In combination, a primary power unit, a drive axle, a transmission connected between said unit and axle and including a countershaft, a secondary power unit having geared connection to said countershaft, a normally open ignition circuit for said secondary unit, means responsive to a predetermined minimum speed of said primary unit conditioning said circuit for energization, and means operative within a predetermined speed range of said primary unit above said minimum speed for energizing said circuit.

3. The combination of claim 2 further characterized in that said primary and secondary power units are internal combustion throttle controlled engines and in the provision of means responsive to the throttle control means of said primary unit interlocked with said circuit energizing means for controlling the throttle of said secondary unit.

4. In combination, a primary power unit, a drive axle, a transmission connected between said unit and axle and including a countershaft, a secondary power unit having geared connection to said countershaft, a normally open ignition circuit for said secondary unit, means responsive to a predetermined minimum speed of said primary unit conditioning said circuit for energization, and interlocking means operative in accordance with predetermined speed conditions above said minimum and the throttle position at said primary unit for energizing said circuit, starting said secondary unit and opening the throttle thereof.

5. In combination, a primary power unit, a drive axle, a transmission connected between said unit and axle and including a countershaft, a secondary power unit having geared connection to said countershaft, a clutch in said connection, a normally open ignition circuit for said secondary unit, means responsive to a predetermined minimum speed for said primary unit conditioning said circuit for energization, and interlocking means responsive to predetermined speed and throttle conditions at said primary unit for energizing said circuit, opening the throttle of said secondary unit, and engaging said clutch.

6. In combination, a main engine having a transmission including a countershaft, an auxiliary engine having a throttle and a clutch, means connecting said auxiliary engine to the countershaft of said transmission, and a fluid pressure operated actuator responsive to predetermined speed and load conditions at the main engine for conjointly engaging said clutch and opening the throttle of said auxiliary engine.

7. In combination, a main engine having a manifold, an auxiliary engine having a throttle and clutch, a common transmission to which both engines are connected, fluid-pressure controlled means for conjointly controlling said clutch and throttle of said auxiliary engine, a fluid pressure connection between said main engine manifold and said pressure-controlled means including a valve, electrically controlled means for actuating said valve, and means responsive to predetermined speed conditions at said main engine for energizing said valve-actuating means.

8. The combination of claim 7 wherein said last-named means is inoperative below a predetermined minimum engine speed or above a predetermined maximum engine speed.

9. In combination, in a vehicle, a main engine having a transmission, an auxiliary engine including a lay shaft extending into laterally spaced relation to said transmission, gearing connecting said lay shaft to said transmission whereby said shaft is rotated whenever said vehicle is in motion, a clutch between said lay shaft and said auxiliary engine, a throttle for said auxiliary engine, fluid pressure-actuated means for conjointly engaging said clutch and opening said throttle, a fluid pressure connection between said means and the induction system of said main engine, and means responsive to predetermined speed conditions and load on said main engine for opening said fluid pressure connection.

10. In combination, in a vehicle, a main engine having a transmission, an auxiliary engine including a lay shaft extending into laterally spaced relation to said transmission, gearing connecting said lay shaft to said transmission whereby said shaft is rotated whenever said vehicle is in motion, a clutch between said lay shaft and said auxiliary engine, a throttle for said auxiliary engine, pneumatic means for conjointly engaging said clutch and opening said throttle, means connecting said pneumatic means to the induction system of said main engine including a valve, and means for opening said valve when the speed of said main engine exceeds a predetermined minimum.

11. In combination, in a vehicle, a main engine having a transmission, an auxiliary engine including a lay shaft extending into laterally spaced relation to said transmission, gearing connecting said lay shaft to said transmission whereby said shaft is rotated whenever said vehicle is in motion, a clutch between said lay shaft and said auxiliary engine, a throttle for said auxiliary engine, pneumatic means for conjointly engaging said clutch and opening said throttle, means connecting said pneumatic means to the induction system of said main engine including a valve, and means for opening said valve when the speed of said main engine exceeds a predetermined minimum, and for closing said valve when said main engine speed exceeds a predetermined maximum.

12. In combination, in a vehicle, a main engine having a transmission, an auxiliary engine including a lay shaft extending into laterally spaced relation to said transmission, gearing connecting said lay shaft to said transmission whereby said shaft is rotated whenever said vehicle is in motion, a clutch between said lay shaft and said auxiliary engine, a throttle for said auxiliary engine, pneumatic means for conjointly engaging said clutch and opening said throttle, means connecting said pneumatic means to the induction system of said main engine including a valve, and means for opening said valve when the speed of said main engine exceeds a predetermined minimum, said pneumatic means operating when said valve is opened only under predetermined load conditions indicated in the induction system of said main engine.

GEORGE D. WILCOX.

REFERENCES CITED

The following references are of record in the file of this patent:

UNITED STATES PATENTS

| Number | Name | Date |
|---|---|---|
| 1,768,530 | Short | June 24, 1930 |
| 845,850 | Carter | Mar. 5, 1907 |
| 2,132,450 | Wolf | Oct. 11, 1938 |

FOREIGN PATENTS

| Number | Country | Date |
|---|---|---|
| 11,155 | French | Oct. 28, 1909 |